United States Patent
Hamilton et al.

(10) Patent No.: US 10,541,979 B2
(45) Date of Patent: Jan. 21, 2020

(54) MULTIPORT CONTENT ENCRYPTION ENGINE

(71) Applicant: Synopsys, Inc., Mountain View, CA (US)

(72) Inventors: Neil Farquhar Hamilton, Kanata (CA); Michael James Lewis, Ottawa (CA); Michael Borza, Ottawa (CA); Andrew A. Elias, Ottawa (CA); A. A. Jithra Adikari, Ottawa (CA)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 14/623,767

(22) Filed: Feb. 17, 2015

(65) Prior Publication Data

US 2016/0241386 A1     Aug. 18, 2016

(51) Int. Cl.
    *H04L 29/06*      (2006.01)

(52) U.S. Cl.
     CPC .............................. *H04L 63/0428* (2013.01)

(58) Field of Classification Search
     CPC ............... H04L 9/0631; H04L 63/0471; H04L 63/0478; H04L 63/0428
     USPC ................................. 713/168; 380/201, 210
See application file for complete search history.

(56) References Cited

U.S. PATENT DOCUMENTS

| | | | | | |
|---|---|---|---|---|---|
| 7,636,439 | B2 * | 12/2009 | Nakabayashi | ........ | H04L 9/0662 380/44 |
| 8,345,871 | B2 * | 1/2013 | Balfanz | ................. | H04L 9/3263 332/100 |
| 2003/0135730 | A1 * | 7/2003 | Szucs | ...................... | G06F 21/10 713/153 |
| 2004/0114629 | A1 * | 6/2004 | Losiewicz | ................. | H04J 9/00 370/478 |
| 2008/0217392 | A1 * | 9/2008 | Weiner | ..................... | G06K 7/14 235/375 |
| 2008/0260048 | A1 * | 10/2008 | Oomen | ................. | G10L 19/008 375/241 |
| 2013/0100464 | A1 * | 4/2013 | Liu | ....................... | G06F 3/1206 358/1.9 |
| 2015/0052360 | A1 * | 2/2015 | Ravishankar | ....... | H04L 63/0428 713/171 |

* cited by examiner

*Primary Examiner* — Dant B Shaifer Harriman
(74) *Attorney, Agent, or Firm* — Jaquez Land Greenhaus LLP; Bruce W. Greenhaus, Esq.

(57) ABSTRACT

A method for ciphering protected content communicated between a first device and a plurality of devices over a plurality of channels comprises performing authentication between the first device and each of the plurality of devices to create two or more shared key and initialization vector pairs allowing the ciphering of the protected content; generating a key stream for each of the channels based on a selected one of the two or more of shared key and initialization vector pairs; maintaining a buffer for each channel, each of the buffer containing the key stream generated for the corresponding channel; and ciphering data incoming on a selected channel using the selected key stream from the buffer corresponding to the selected channel.

3 Claims, 6 Drawing Sheets

MULTIPORT CONTENT ENCRYPTION ENGINE

FIELD OF THE INVENTION

The present disclosure relates to content protection.

SUMMARY

In accordance with one embodiment, a method is provided for ciphering protected content communicated between a first device and a plurality of devices over a plurality of channels. The method comprises performing authentication between the first device and each of the plurality of devices to create two or more shared key and initialization vector pairs allowing the ciphering of the protected content; generating a key stream for each of the channels based on a selected one of the two or more shared key and initialization vector pairs; maintaining a buffer for each channel, each of the buffer containing the key stream generated for the corresponding channel; and ciphering data incoming on a selected channel using the selected key stream from the buffer corresponding to the selected channel. In one implementation, the generated key stream is based on an Advanced Encryption Standard process. The plurality of channels may comprise a plurality of plain text inputs, with each of the plain text inputs being reformatted into a plurality of reformatted plain text inputs, and the plurality of reformatted plain text inputs being ciphered selectively to generate a plurality of ciphered outputs of a plurality of formats. The plurality of channels may comprise one cipher text input that is deciphered, then reformatted into a plurality of reformatted plain text input, and then ciphered into a plurality of ciphered outputs of a plurality of formats.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
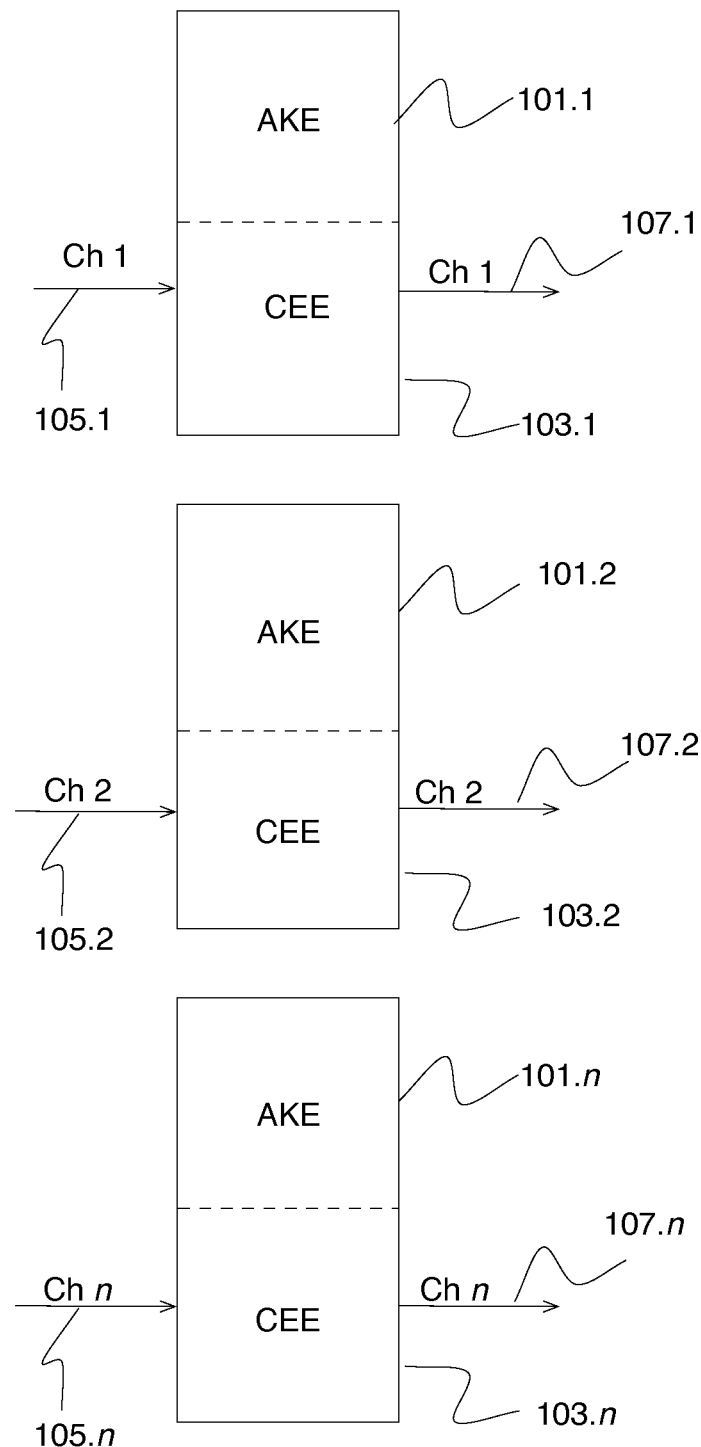
FIG. 1 is a diagrammatic illustration of a prior art encryption/decryption system.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Content encryption and decryption is necessary on most multimedia devices. Throughout the remainder of this document, "encryption" will be understood to mean encryption or decryption, as appropriate to the context. Generically a multimedia device comprises a plurality of ports or channels, each port carries content or data, and communicates with a plurality of other devices via these channels.

When the communication between two devices needs to be protected, the two devices perform an authentication process and exchange shared keys and other data that is used by each device for the encryption and decryption of the content or data.

The protected content on a channel is then processed (encrypted or decrypted) by a Content Encryption Engine (CEE), which includes or is tightly coupled to an Authentication and Key Exchange processor (AKE). The AKE processor performs the authentication with the other device's AKE processor such that it is allowed to send or receive content to or from the other device. The pair of AKE processes establish a shared key and initialization vector used by the CEE.

In existing systems, as shown in FIG. 1, each port or channel 105.1 ... 105.n implements the CEE 103.1 ... 103.n and AKE 101.1 ... 101.n processes independently to generate output content (encrypted or decrypted) 107.1 ... 107.n in a given format. A device may include several CEE and AKE processors, each handling one protected channel.

As content protection standards evolve, the CEE and AKE processes become increasingly complex and require a lot of processing. There is a need to combine some of the processing of the content protection such that it can be shared amongst two or more ports in a device.

Figure 2:
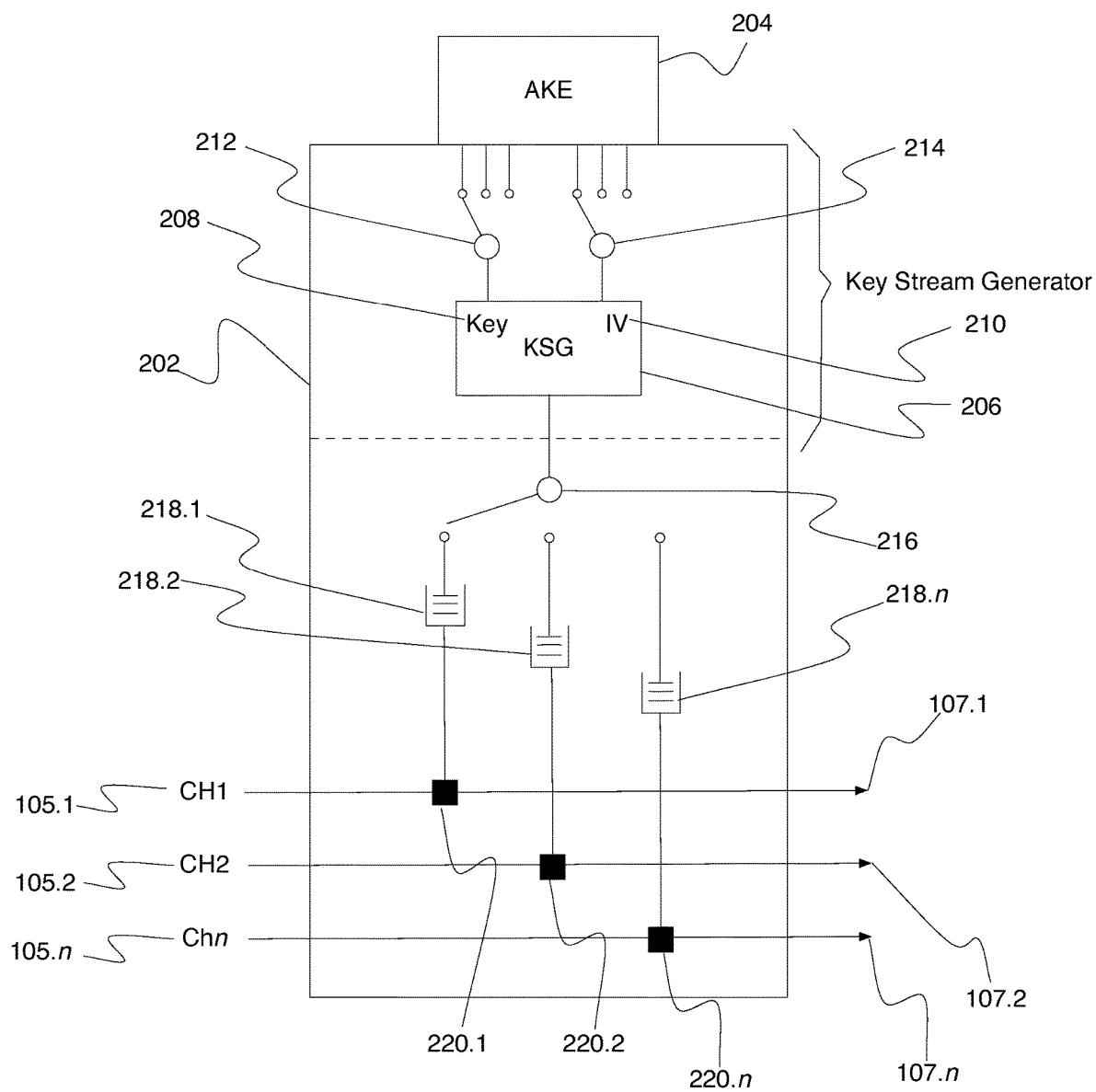
FIG. 2 is a diagrammatic illustration of an example of the building blocks for an improved encryption/decryption system.
Figure 2A:
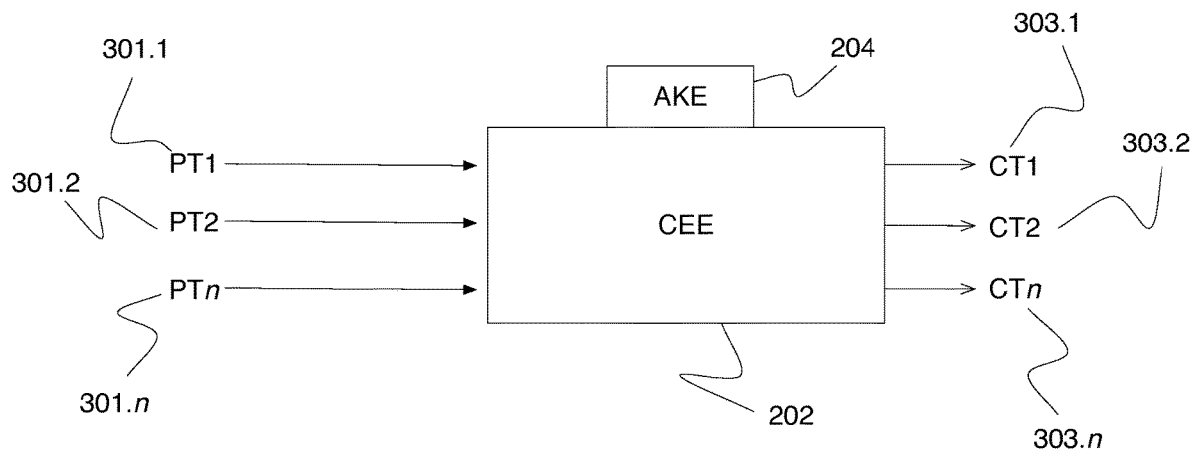
FIG. 2A is a diagrammatic illustration of a multi-port content encryption engine.
Figure 3:
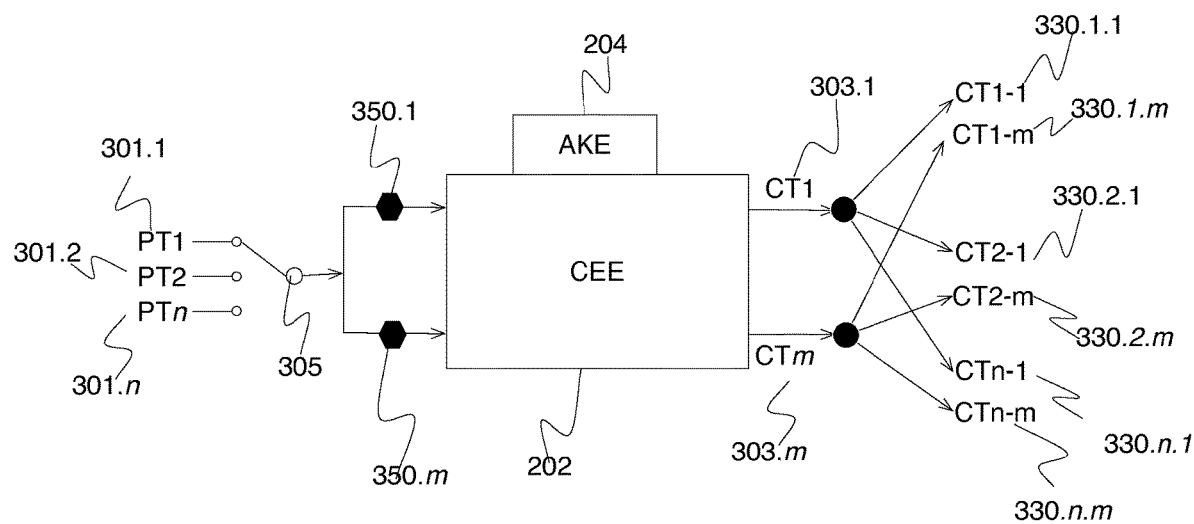
FIG. 3 is a diagrammatic illustration of an embodiment implementing a distributor application.

FIG. 3 shows an embodiment where the building blocks of FIG. 2 are used for a distributor application. In this application, selector function 305 selects which of the n plain text input 301.1, 301.2 ... 301.n to process. The input is split into m streams which are reformatted 350.1 ... 350.m into m formats. Each format is then processed by a single CEE 202 using a single AKE 204 to generate reformatted cipher text output 303.1 ... 303.m, which are then selectively delivered to the n channels 330.1.1 ... 330.1.m, 330.2.1 ... 330.2.m, 330.n.1 ... 330.n.m, 303.2, 303.n based on the input.

Figure 4:
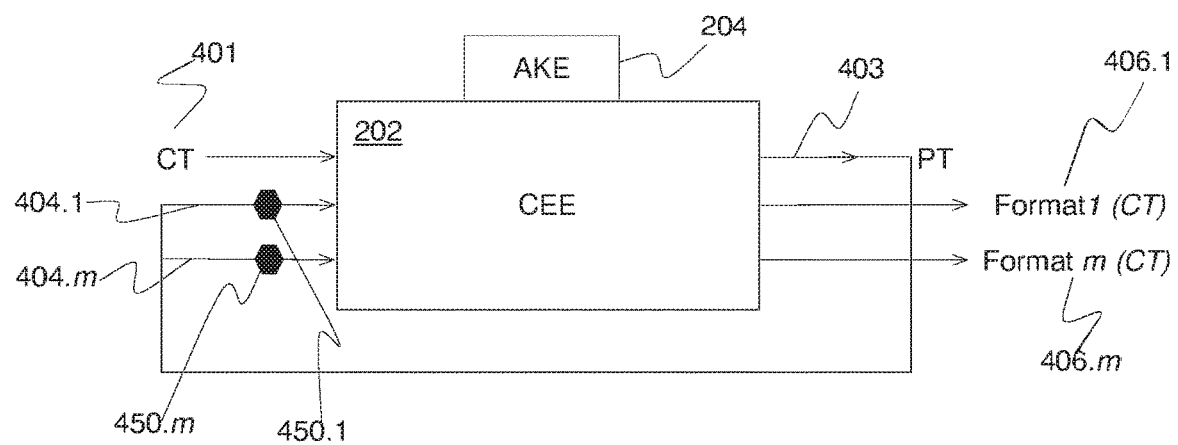
FIG. 4 is a diagrammatic illustration of an embodiment implementing a repeater-convertor application.

FIG. 4 shows an embodiment where the building blocks of FIG. 2 are used for a repeater-convertor application. In this application, one input of ciphered text 401 is decrypted by a CEE 202 and AKE 204 process. The output plain text 403 is optionally replicated into one or more input stream 404.1 ... 404.m each converted 450.1, 450.2 ... 450.n into a format before it reenters the CEE 202, resulting in an output of m cipher text streams of different format 406.1 ... 406.m.

Figure 5:
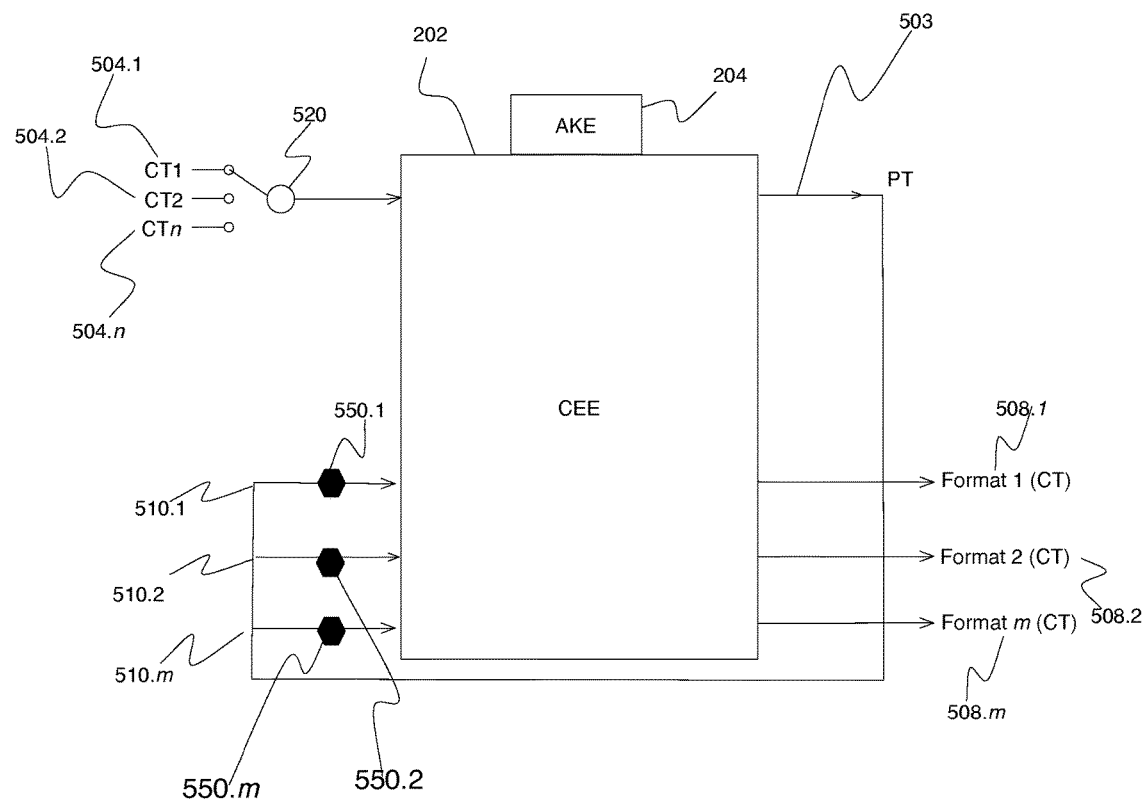
FIG. 5 is a diagrammatic illustration of an embodiment combining the repeater and distributor applications.

FIG. 5 shows an embodiment combining the repeater and distributor applications. In this application, n cipher text streams 504.1 ... 504.n enter the CEE 202 selectively 520 for decryption into one stream of plain text 503. The stream of plain text is optionally replicated into one or more input streams 510.1, 510.2 ... 510.n and converted 550.1, 550.2 ... 550.n into a format before entering the CEE 202 to generate output is ciphered text converted to m formats 508.1 ... 508.f.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A multiport content encryption engine comprising:
   (a) a selector implemented in hardware, having a plurality of inputs and an output, the selector configured to receive a plurality of plain text inputs identified for communication from a first communication device in which the multiport content encryption engine resides to a second communication device that is external to the first communication device, the plain text inputs being received at each of the inputs and further configured to select from among the plurality of plain text inputs to be coupled to the output of the selector and output a plurality of replicated streams of the selected plain text input;
   (b) a plurality of reformatting plain text nodes within the first communication device coupled to the output of the selector, the nodes configured to receive the plurality of replicated streams of the plain text input, reformat the replicated streams of plain text and output a plurality of reformatted plain text streams;
   (c) an Authentication and Key Exchange (AKE) processor implemented in hardware within the first communication device coupled to the nodes and configured to perform authentication with an AKE within the second communication device, such that the AKE within the first communication device is allowed to send or receive content to or from the second communication device by establishing a shared key and initialization vector pair; and
   (d) a Content Encryption Engine (CEE) implemented in hardware within the first communication device and coupled to the AKE processor, the CEE configured to receive information to indicate authentication of the plurality of reformatted plain text streams by the AKE through the use of the shared key and initialization vector, generate a key stream for each of a plurality of channels, such that a plurality of channels that comprise one cipher text input that is deciphered, then reformatted into a plurality of reformatted plain text input, and then ciphered into a plurality of ciphered text stream outputs of a plurality of formats and output the plurality of ciphered text streams from the CEE.

2. A multiport content encryption engine comprising:
   (a) at least one channel configured to carry data;
   (b) an Authentication and Key Exchange (AKE) processor implemented in hardware and configured to perform authentication with an external device to allow sending and receiving of content between the multiport content encryption engine and the external device;
   (c) a plurality of reformatting plain text nodes, each having an input coupled to a corresponding one of the at least one channel and configured to receive one of a plurality of replicated streams of plain text, reformat the replicated streams of plain text and output a plurality of reformatted plain text streams; and
   (d) a Content Encryption Engine (CEE) implemented in hardware and coupled to the AKE processor to receive information indicating authentication of the ciphered text, the CEE having:
      (i) a ciphered text input configured to receive ciphered text,
      (ii) a plain text output coupled to the inputs of the plurality of reformatting plain text nodes and configured to output a plurality of reformatted replicated plain text streams that have been decrypted and reformatted;
      (iii) a plurality of inputs configured to receive the reformatted replicated plain text streams; and
      (iv) a plurality of cipher text outputs configured to output a plurality of cipher text streams of different formats;
      wherein the CEE receives the cipher text, outputs the plain text, receives reformatted replicated plain text and encrypts the reformatted replicated plain text to form the plurality of cipher text streams of different formats.

3. A multiport content encryption engine comprising:
   (a) a selector, having a plurality of inputs and an output, the selector configured to receive a plurality of plain text inputs from a plurality of channels and to select from among the plurality of plain text inputs to be coupled to the output of the selector;

(b) an Authentication and Key Exchange (AKE) processor implemented in hardware and configured to perform authentication with an external device to allow sending and receiving of content between the multiport content encryption engine and the external device;

(c) a plurality of reformatting plain text nodes having an input configured to receive a plurality of replicated streams of plain text, reformat the replicated streams of plain text, and output a plurality of reformatted plain text streams; and (d) a Content Encryption Engine (CEE) implemented in hardware and coupled to the AKE processor to allow authentication of the ciphered text, the CEE having:
  (i) a ciphered text input coupled to the selector and configured to receive ciphered text;
  (ii) a plain text output configured to output plain text that has been decrypted and to couple the plain text to inputs of the plurality of reformatting plain text nodes;
  (iii) a plurality of inputs configured to receive the plurality of reformatted plain text streams from the plurality of reformatting plain text nodes; and
  (iv) a plurality of cipher text outputs configured to output a plurality of cipher text streams of different formats;

wherein the CEE receives the cipher text, outputs the plain text, receives reformatted replicated plain text and encrypts the reformatted replicated plain text to form the plurality of cipher text streams of different formats.

* * * * *